United States Patent
Allocca et al.

(10) Patent No.: US 10,678,192 B1
(45) Date of Patent: Jun. 9, 2020

(54) OPTIMIZATION OF PRODUCTION SYSTEMS

(71) Applicant: Amazon Technologies, Inc., Seattle, WA (US)

(72) Inventors: William Wallace Allocca, Bellevue, WA (US); James Cade Bodley, Seattle, WA (US); Ram Cherukuri, Bellevue, WA (US); Nitin Sivakrishnan, Seattle, WA (US); Nandan U Telang, Seattle, WA (US)

(73) Assignee: Amazon Technologies, Inc., Seattle, WA (US)

(*) Notice: Subject to any disclaimer, the term of this patent is extended or adjusted under 35 U.S.C. 154(b) by 447 days.

(21) Appl. No.: 15/352,241

(22) Filed: Nov. 15, 2016

Related U.S. Application Data

(63) Continuation of application No. 13/797,758, filed on Mar. 12, 2013, now Pat. No. 9,524,330.

(51) Int. Cl.
| | |
|---|---|
| *G06F 16/00* | (2019.01) |
| *G05B 13/02* | (2006.01) |
| *G06Q 30/06* | (2012.01) |
| *G06F 16/2453* | (2019.01) |
| *G06F 9/46* | (2006.01) |

(52) U.S. Cl.
CPC ....... *G05B 13/024* (2013.01); *G06F 16/2453* (2019.01); *G06Q 30/0635* (2013.01); *G05B 2219/32015* (2013.01); *G06F 9/466* (2013.01)

(58) Field of Classification Search
CPC ........ G05B 13/024; G05B 2219/32015; G06Q 30/0635; G06F 16/2453; G06F 9/466
See application file for complete search history.

(56) References Cited

U.S. PATENT DOCUMENTS

| | | | |
|---|---|---|---|
| 7,295,990 B1* | 11/2007 | Braumoeller | ........ G06Q 10/063 705/7.31 |
| 2002/0120529 A1 | 8/2002 | Buettgenbach et al. | |
| 2003/0195984 A1 | 10/2003 | Zisapel et al. | |
| 2004/0054607 A1* | 3/2004 | Waddington | ........... G06Q 10/08 705/28 |
| 2006/0004927 A1* | 1/2006 | Rehman | .................. G06F 16/95 709/250 |
| 2006/0294047 A1* | 12/2006 | Johnston | ............ G05B 19/0426 |
| 2007/0245352 A1 | 10/2007 | Ma | |
| 2008/0016214 A1 | 1/2008 | Galluzzo et al. | |
| 2010/0121730 A1 | 5/2010 | Roden et al. | |

(Continued)

OTHER PUBLICATIONS

Office Action for U.S. Appl. No. 13/797,758, dated Feb. 11, 2015, William W. Allocca, "Optimization of Production Systems", 31 pages.

(Continued)

*Primary Examiner* — Alexander Khong
(74) *Attorney, Agent, or Firm* — Lee & Hayes, P.C.

(57) ABSTRACT

The systems and techniques described herein optimize processing of requests, such as external requests, internal requests or inter-service requests. In some examples, a service may interact with a client device and determine, based at least in part on a state of the interaction with the client device, a potential client request that may subsequently be received from the client device. The service may then perform one or more actions to at least partially fulfill the potential client request.

20 Claims, 12 Drawing Sheets

(56) References Cited

U.S. PATENT DOCUMENTS

| | | |
|---|---|---|
| 2011/0039585 A1 | 2/2011 | Rouse et al. |
| 2011/0055376 A1 | 3/2011 | Little |
| 2013/0159144 A1* | 6/2013 | Higgins ............. G06Q 30/0601 |
| | | 705/26.81 |
| 2013/0204747 A1 | 8/2013 | Zhao |
| 2013/0238464 A1 | 9/2013 | Bank et al. |
| 2013/0246098 A1 | 9/2013 | Habboush et al. |
| 2013/0311622 A1 | 11/2013 | Das Gupta et al. |
| 2014/0188668 A1* | 7/2014 | Brabec ............... G06Q 30/0635 |
| | | 705/26.81 |
| 2014/0289071 A1* | 9/2014 | Fox .................... G06Q 30/0631 |
| | | 705/26.7 |

OTHER PUBLICATIONS

Office action for U.S. Appl. No. 13/797,758 dated Feb. 3, 2016, Allocca et al., "Optimization of Production Systems", 33 pages.
Office action for U.S. Appl. No. 13/797,758 dated Sep. 10, 2015, Allocca et al., "Optimization of Production Systems", 40 pages.

* cited by examiner

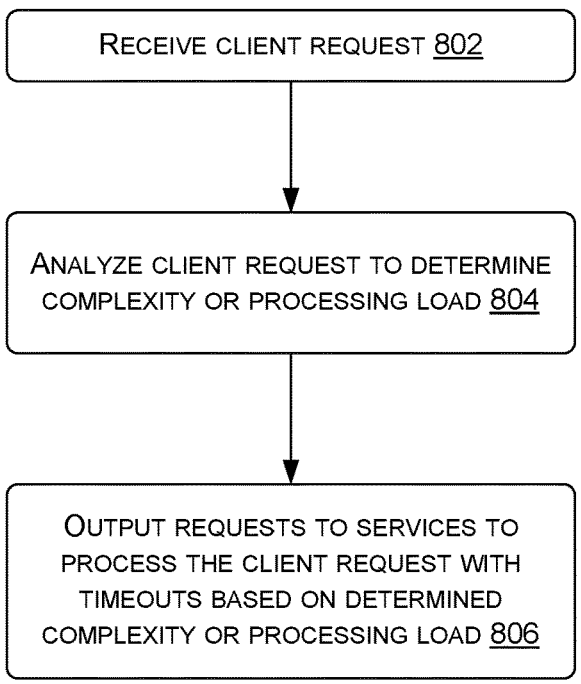

```
                    ┌─────────────────────────────┐
                    │  RECEIVE CLIENT REQUEST 802 │
                    └──────────────┬──────────────┘
                                   │
                                   ▼
                    ┌─────────────────────────────┐
                    │ ANALYZE CLIENT REQUEST TO   │
                    │ DETERMINE COMPLEXITY OR     │
                    │ PROCESSING LOAD 804         │
                    └──────────────┬──────────────┘
                                   │
                                   ▼
                    ┌─────────────────────────────┐
                    │ OUTPUT REQUESTS TO SERVICES │
                    │ TO PROCESS THE CLIENT       │
                    │ REQUEST WITH TIMEOUTS BASED │
                    │ ON DETERMINED COMPLEXITY OR │
                    │ PROCESSING LOAD 806         │
                    └─────────────────────────────┘
```

FIG. 8

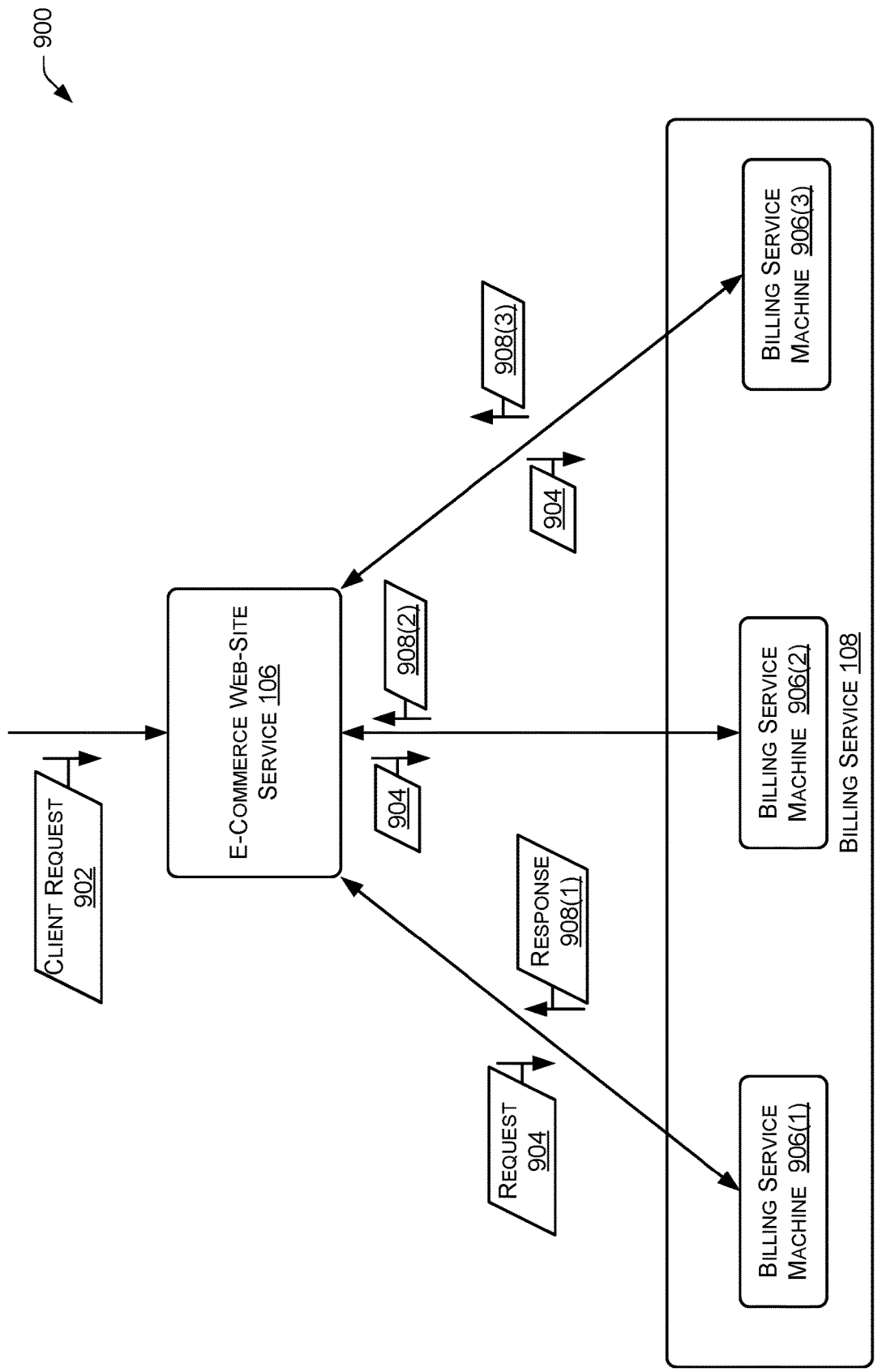

US 10,678,192 B1

OPTIMIZATION OF PRODUCTION SYSTEMS

CROSS REFERENCE TO RELATED APPLICATION

This U.S. non-provisional patent application is a continuation of and claims priority to pending U.S. patent application Ser. No. 13/797,758, filed on Mar. 12, 2013, the contents of which are incorporated herein by reference.

BACKGROUND

Various systems, such as electronic commerce systems, may have delays associated with various functions. For example, in an electronic commerce system, certain actions performed by customers, such as placing an order, may require database inserts. Database inserts may be time-consuming and may introduce a delay from the customer's perspective prior to a result being provided. In another example involving electronic commerce systems, a user performing an action for a first time may perceive a delay due to the data involved in the action not being present in cache. Such delays may have an adverse effect on a customer's experience. Therefore, it is desirable for systems to alleviate such delays to increase, among other things, customer satisfaction.

BRIEF DESCRIPTION OF THE DRAWINGS

The detailed description is described with reference to the accompanying figures. In the figures, the left-most digit(s) of a reference number identifies the figure in which the reference number first appears. The same reference numbers in different figures indicate similar or identical items.

FIG. 8 is a flow diagram of an illustrative process to provide for the optimization of timeouts for requests between, for example, services of a multi-service production system.

FIG. 9 is a schematic diagram of an illustrative environment that provides for the optimization of response times for requests between, for example, services of a multi-service production system.

DETAILED DESCRIPTION

Overview

Figure 1:
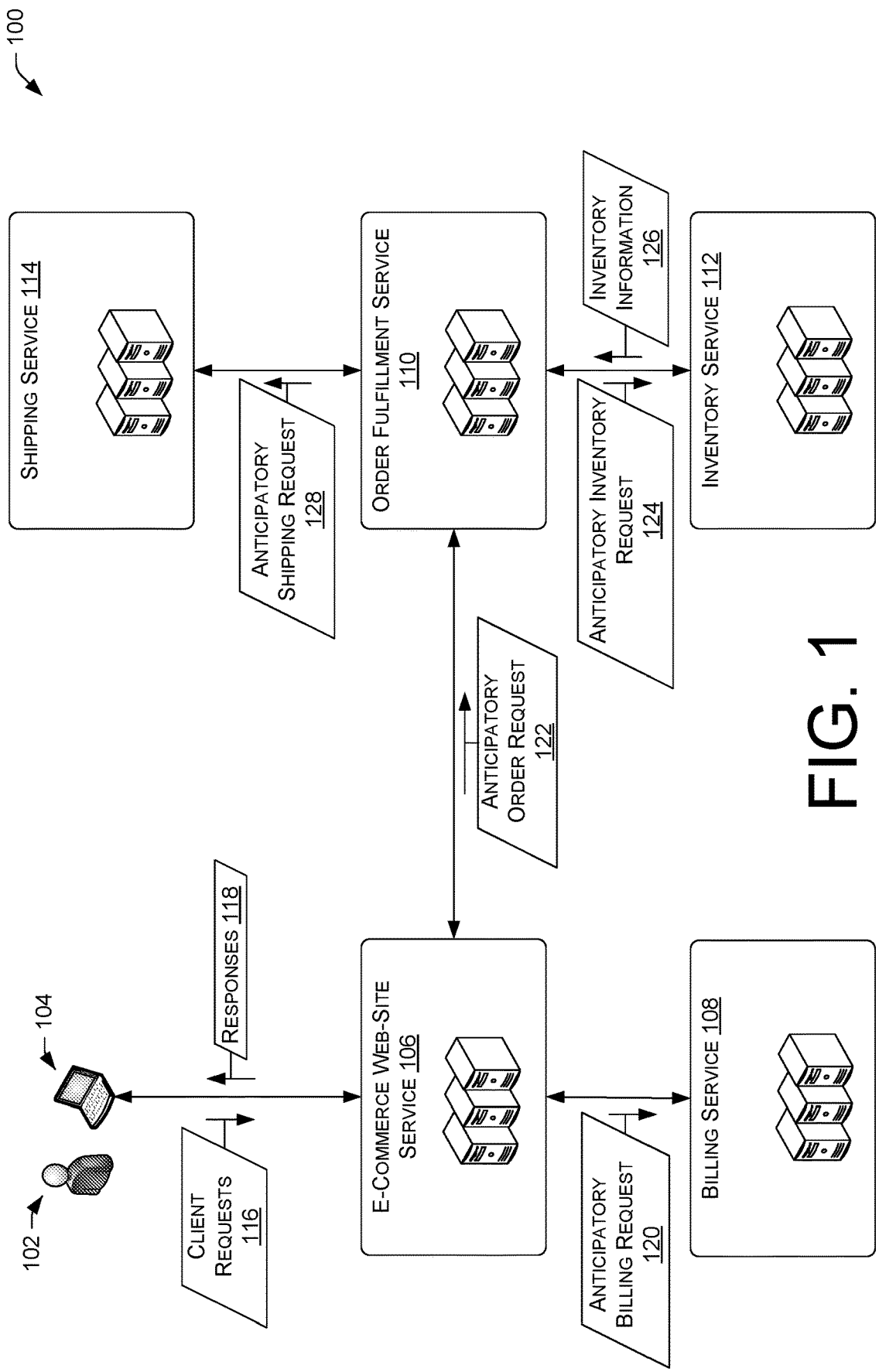
FIGS. 1-2 are schematic diagrams of an illustrative environment that may provide optimization of request handling in production systems.

This disclosure is directed in part to the use of system resources to optimize processing of requests, such as external requests, internal requests or inter-service requests. In some implementations, the disclosed techniques and systems may anticipate or determine potential client requests that may be subsequently received from a client. The potential client requests may be determined based on a state of interaction with a client device. Based on the potential client requests, the disclosed systems and techniques may perform one or more actions to at least partially fulfill the potential client request. For example, for some requests, the disclosed systems and techniques may perform the actions to fulfill the potential client request, such as loading data from storage, but then discard the result of the potential client request. In some implementations, performing the actions to fulfill the potential client request and then discarding the results may provide for a "pre-caching" of data that may be used to fulfill a client request of the client that is subsequently received. In such cases, the use of the pre-cached data may allow for a quicker response to the client. For other requests, such as potential client requests that involve an action that may cause a delay (e.g. database insertions), the disclosed systems and techniques may mark at least some of the results of the potential client request as "pending" rather than discard the results. For example, in the case of a potential client request involving a database insertion, some implementations may perform the database insertion and mark the inserted database record as "pending." If a corresponding client request is subsequently received, some implementations may mark the pending database record as "active" without the needed to re-insert the database record. As the database insertion is not performed during client interaction, a user (i.e. client) may receive a response to the client request more quickly. Of course, though the server may serve the response to the client more quickly, other factors, such as bandwidth, latency, and the like may still delay the receipt of the response to the client request.

For some requests, such as the aforementioned requests that involve an action that may cause a delay, the action that may cause a delay may be processed in parallel or in a post-processing after interaction with a client regarding the request is completed. For example, in the case of a request that involves a database insertion, some implementations may generate data that corresponds to the database record and store the generated data outside the database. The interaction with the client may then continue based on the generated data stored outside the database. The database record may be inserted into the database using the generated data in parallel with or in post processing after the interaction with the client regarding the request. As the database insertion is not performed during the client interactions or is performed in parallel to the client interactions, a user (i.e. client) may receive a response to the client request more quickly.

In some implementations, timeouts on requests may be determined dynamically to handle requests with variable processing complexity (i.e. requests with different processing loads to fulfill). For example, when a client device is to issue a request to a target device, the client device may analyze the requests to determine a processing load to fulfill the request and set a timeout for the requests based on the determined processing load. In some implementations, such as implementations involving a multi-service system, a requesting service may issue multiple requests to different processing entities of the target service and accept the first received response from the processing entities of the target service and discard subsequently received responses to the request. In some implementations, such as the aforementioned implementations involving multi-service system, a load balancer may balance requests among various processing entities of the system or service based on aggregate processing loads of the requests assigned to the various processing entities.

The discussion above provides various examples of the implementations of the techniques and systems provided herein. These examples should not be taken as limiting. The techniques and systems described herein may be implemented in a number of ways. Example implementations are provided below with reference to the following figures.

Illustrative Environment

FIG. 1 is a schematic diagram of an illustrative environment 100 that may provide for optimization of request handling in production ("live") systems. For example, in some implementations according to FIG. 1, the illustrative environment 100 may provide for optimization of the handling of requests that include actions that may cause a delay in responding to the requestor, for example, database record insertion. In some implementations according to FIG. 1, an e-commerce web site service may issue anticipatory requests to various services. The anticipatory requests may cause the services to make database inserts prior to the user making a request corresponding to the inserted database records. In some implementations, the anticipatory database records may be marked in a "pending" or similar status until the user makes the corresponding request. The computing architecture of the environment 100 may be implemented in a distributed or non-distributed configuration.

As shown in FIG. 1, the illustrative environment 100 includes a user 102 operating a user device 104, an e-commerce website service 106, a billing service 108, an order fulfillment service 110, an inventory service 112 and a shipping service 114. The services 106-114 may be services of an e-commerce system. As illustrated in FIG. 1, the services 106, 108, 110, 112 and 114 may include fleets of machines. Herein, these fleets are made up of system resources. These system resources may be computing devices, distributed computing services, server farm(s), or other types of resources. While shown as stand-alone items, one of ordinary skill in the art would understand that the e-commerce website service 106, billing service 108, order fulfillment service 110, inventory service 112 and the shipping service 114 may be operated by the same or separate system resources.

In operation, the user 102 (e.g., a downstream consumer or user) may, using the user device 104, transmit a client request 116 to the e-commerce website service 106. Some examples of client requests 116 may include product information requests, account information requests, "shopping cart" information requests, request to initiate a check out process, requests associated with the check out process, order placement requests, etc. In some implementations, the client request 116 may be a request generated by another service, another system or another process, and may not be a human-generated request. Though illustrated in the context of an e-commerce website service, implementations of the systems and techniques disclosed herein are not so limited and may be applied in the context of other systems and/or services, such as an electronic marketplace, an electronic financial service, a messaging service, a social network, and/or any other system or service that exchanges electronic data with users, other services and/or other systems.

In operation, the e-commerce website service 106 receives client request 116 and processes the client request 116 in conjunction with the billing service 108, the order fulfillment service 110, the inventory service 112 and the shipping service 114 and returns responses 118 to the user device 104. As discussed above, in the implementation illustrated in FIG. 1, the e-commerce website service 106 anticipates or determines potential actions on the part of the user 102 (i.e. possible future actions), such as placing an order for a product currently being viewed by the user 102 on the user device 104 or for a product currently in a cart of the user 102. The e-commerce website service 106 may also determine which of the anticipated potential actions of the user 102 may require, for example, a database insert that could result in a perceivable delay in the completion of the potential action. For those actions that may result in a perceivable delay, the e-commerce website service 106 may issue anticipatory requests to the other services. In the illustrated example implementation of FIG. 1, the anticipated client request is a client order. As such, the e-commerce website service 106 may issue an anticipatory billing request 120 to the billing service 108 and an anticipatory order request 122 to the order fulfillment service 110. The e-commerce website service 106 may also store a record of anticipated client requests for which anticipatory requests have been issued to other services along with other information regarding the details of the anticipated client requests and the results of the anticipatory request to the other services.

While the discussion of FIG. 1 is in the context of database insertions, this is an example for ease of explanation and implementations of the systems and techniques disclosed herein are not so limited and may be applied to other processes and operations. Further, the determination of which potential actions of the user 102 may cause a perceivable delay is also merely an example and implementations of the disclosed systems and techniques are not so limited and may be applied to any type of request or all requests.

Upon receiving the anticipatory billing request 120, the billing service 108 may process the anticipatory billing request 120 and make database insertions appropriate for a billing request corresponding to an actual client order, but mark the inserted database record as "pending." Similarly, the order fulfillment service 110 may process the anticipatory order request 122 in a similar fashion to an order request corresponding to an actual client request. In the example implementation illustrated FIG. 1, when the anticipatory order request 122 is received, the order fulfillment service 110 issues an anticipatory inventory request 124 to the inventory service 112. The inventory service 112 queries an inventory database to determine at least one warehouse or other source of the product(s) that are included in the anticipatory order request 122 which may be used to fulfill the anticipated order if the user places the order. The inventory information 126 is then returned to the order fulfillment service 110.

While discussed above as causing an inventory lookup without modifying the inventory database, the anticipatory inventory request 124 is not so limited. For example, in some implementations, the anticipatory inventory request 124 may cause the inventory system 112 to decrement the inventory level of the product(s) involved in the anticipated order. These changes to the inventory level may be marked as pending in a similar manner to those discussed above. Depending on the implementation, the effect of the pending change in inventory level may vary. For example, inventory levels may be presented to users 102 at the time the user views the product(s) on an e-commerce store website. In some implementations, the pending decrement of the inventory level may have the effect that other users see the inventory level as already reduced. However, in other implementations, the inventory level displayed to other users may remain unchanged prior to receiving an order request from the client.

Depending on the implementation, either of these approaches may have advantages and disadvantages. For example, by showing an unchanged inventory level, some implementations may encourage a different user to make a purchase where an implementation showing the reduced inventory level would indicate the product is out of stock. On the other hand, presenting the reduced inventory level to other users may avoid user frustration or dissatisfaction in the case that a different user is shown that the product is in stock but the pending order is executed prior to the receipt of an order from the different user.

In another variation of the treatment of the inventory levels based on pending changes, if an inventory level is low, the e-commerce system may have a functionality that allows the e-commerce website service 106 to inform the user 102 that, of the remaining inventory, one or more items have been temporarily reserved for the user 102 but that the user 102 must make the order with in some time period to maintain the reservation. Such an implementation may provide an incentive for the user 102 to make the order thereby providing a benefit to the e-commerce website system.

Some implementations may utilize the pending changes from an anticipated order of a first user to execute an order request received from a different user. For example, if an order request is received from a different user while a decrement of the inventory system is pending, the pending decrement may be changed to an active status for the order of the different user and a new pending decrement corresponding to the previously anticipated order may be performed.

Further, these approaches are not mutually exclusive and have applicability to other services. For example, the inventory displayed to other users may be determined based on the anticipated order type. For example, in the case of a user viewing a final confirmation page to complete an anticipated order, other users may already be displayed the inventory level as reduced. At the same time, in a case of a pending order based on an item being placed in a shopping cart or an anticipated "one click" or similar type of order, other users may be shown an unchanged inventory level.

Upon receiving the inventory information 126, the order fulfillment service 110 issues an anticipatory shipping request 128 to the shipping service 114. The shipping service 114 receives the anticipatory shipping request 128 and makes database insertions into a shipping database in a manner similar to the processing of a shipping request corresponding to an actual order but marks the inserted database record as "pending."

Similarly, the order fulfillment service 110 may make insertions into an order fulfillment service database corresponding to the anticipated order which may also be marked as "pending." In some implementations, the database record in the order fulfillment service database may be based on feedback from the inventory service 112 and shipping service 114.

Once the anticipated order has been processed and the corresponding database records have been inserted, the database records may remain in the pending status until the user 102 issues a client request 116 to the e-commerce website service 106 corresponding to the inserted database records. However, in some implementations, the pending database records may expire if a corresponding client request 116 is not received within some amount of time, before a session expires, within a number of client requests 116, etc.

It should be noted that other operations may be performed by the services. For example, the shipping service 114 may calculate a shipping cost, the billing service 108 may calculate a tax for the anticipated billing request 122, and so on. The communication scheme shown and discussed with regard to FIG. 1 is a simple scenario and many other exchanges may be involved. For example, the billing service 108 may request inventory and shipping information from services 112 and 114 to determine the total cost for an anticipatory billing request 120. In another example, the billing service 108 may request this information from the order fulfillment service 110.

Figure 2:
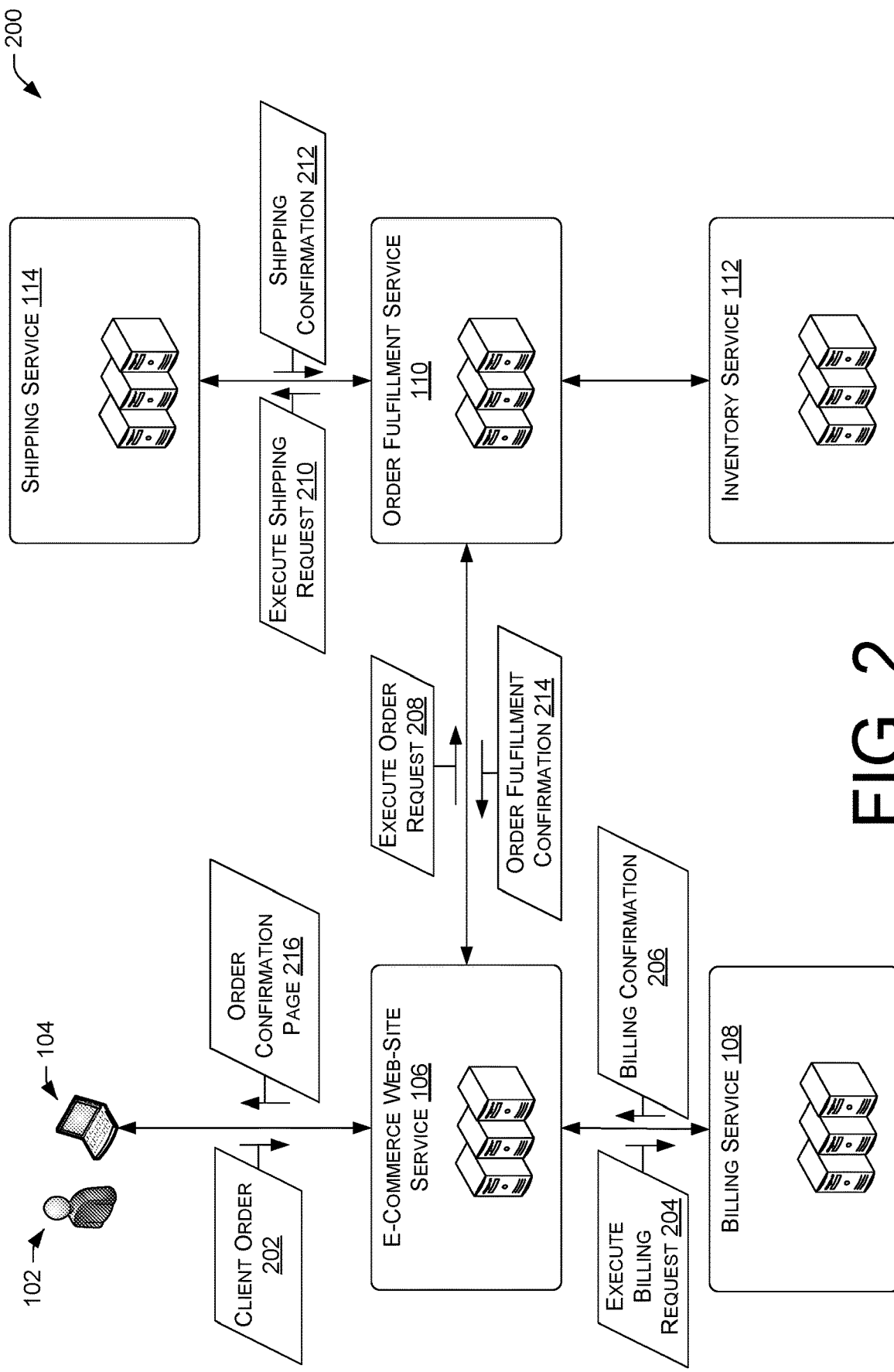

FIG. 2 is a schematic diagram of an illustrative computing environment 200 that corresponds to the computing environment 100 at a subsequent time when a client order 202 that corresponds to an anticipated order for which a corresponding anticipatory billing request 120 and a corresponding anticipatory order request 122 were issued by the e-commerce website service 106. For the purpose of FIG. 2, it is assumed that the client order 202 is received prior to the expiration of the corresponding pending database records.

When the client order 202 is received by the e-commerce website service 106, the e-commerce website service 106 determines whether an anticipated order was processed (i.e. were an anticipatory billing request 120 and an anticipatory order request 122 that corresponded to the client order 202 issued the services 108 and 110). If such an anticipated order was issued, the e-commerce website service 106 may issue an "execute billing" request 204 to the billing service 108. The execute billing request 204 may identify the anticipatory billing request 120 determined to correspond to the client order 202.

Upon receiving the execute billing request 204, the billing service 108 may change the status of the previously inserted database record from "pending" to an "active" status such that the processing of the billing for the client order 202 is executed or queued to be executed. For example, when the status of the database record is changed to "confirmed," the billing service 108 may queue for processing a credit card transaction for an amount specified either in the anticipatory billing request 120 or the execute billing request 204. The billing service 108 may also utilize information from the corresponding database record. Once the billing service 108 has successfully carried out the billing process, a billing confirmation 206 is provided to the e-commerce website service 106.

Upon receiving the billing confirmation 206, the e-commerce website service 106 may issue an "execute order" request 208 to the order fulfillment service 110. The execute order request 208 may identify the anticipatory order request 122 determined to correspond to the client order 202.

Upon receiving the execute order request 208, the order fulfillment service 110 may issue an "execute shipping" request 210 to the shipping service 114. If the order fulfillment service 110 maintains an order fulfillment database, the database record corresponding to the client order 202 may be change from a "pending" status to an "active" status.

In response to the execute shipping request 210, the shipping service 114 may utilize the execute shipping request 210 to determine if the execute shipping request 210 corresponds to a previously inserted pending database record in a shipping database. If so, the shipping service 110 may change the status of the previously inserted database record from the "pending" status to an "active" status such that the items included in the client order 202 are placed in a queue for shipping. Once the shipping service 114 has successfully queued the products for shipping, the shipping service 214 may return a shipping confirmation 212 to the order fulfillment service 110. In turn, the order fulfillment service 110 may return an order fulfillment confirmation 214 to the e-commerce website service 106 indicating that the order fulfillment process is complete.

Once the e-commerce website service 106 has received the order fulfillment confirmation 214, the e-commerce website service 106 may return an order confirmation page 216 to the user device 104 of the user 102 that confirms the client order 202 has been processed successfully.

Utilizing the above described techniques and systems, some implementations may avoid processing delays associated with database insertions that may otherwise disrupt the experience of the user 102 or have negative impact customer satisfaction.

As noted above, for the purposes of FIG. 2, client order 202 was assumed to have been received by the e-commerce website service 106 before the expiration of the corresponding pending database records. In a case in which the database records had already expired, some implementations may process the client order 202 in a conventional fashion. On the other hand, in some implementations, the expiration of a pending database record is prevented from occurring until the interaction with the user 102 has progressed to a point where a client request corresponding to the pending database record cannot be received or is unlikely to be received. For example, if a pending database record corresponds to a potential client order for a product in the user's shopping cart and the user subsequently removes the product from the user's shopping cart, an order for the product may be determined to be unlikely to be received. Thus, the pending database records may be expired by the system.

The above described operations of the environments 100 and 200 are merely examples and should not be taken as limiting. For example, the above discussion includes various database insertions throughout the system illustrated in FIGS. 1 and 2. In some implementations, the e-commerce website service 106 may not interact with other services to handle potential client requests. Rather, the database insertions may be done at the e-commerce website service 106 such that when an actual client request is received that corresponds to a pending record in the e-commerce website service 106 database, the pending record is set to active and thereby causes the e-commerce website service 106 to communicate with the other services. Similarly, some implementations may not involve multiple services. Therefore, such inter-service interaction would not be involved to handle potential client requests. In another example, rather than issuing anticipatory requests to the billing service 108 and order fulfillment service 110 prior to the receipt of the client order 202, the e-commerce website service 106, the billing service 108, order fulfillment service 110, inventory service 112 and shipping service 114 may generate non-database records for use during the order process and records may be inserted into databases in parallel or in post processing, as necessary. Such an implementation is discussed below with regard to FIG. 5. These and other variations on the manner of determining what anticipatory requests to issue in what contexts would be apparent to one of ordinary skill in the art in view of this disclosure.

Figure 3:
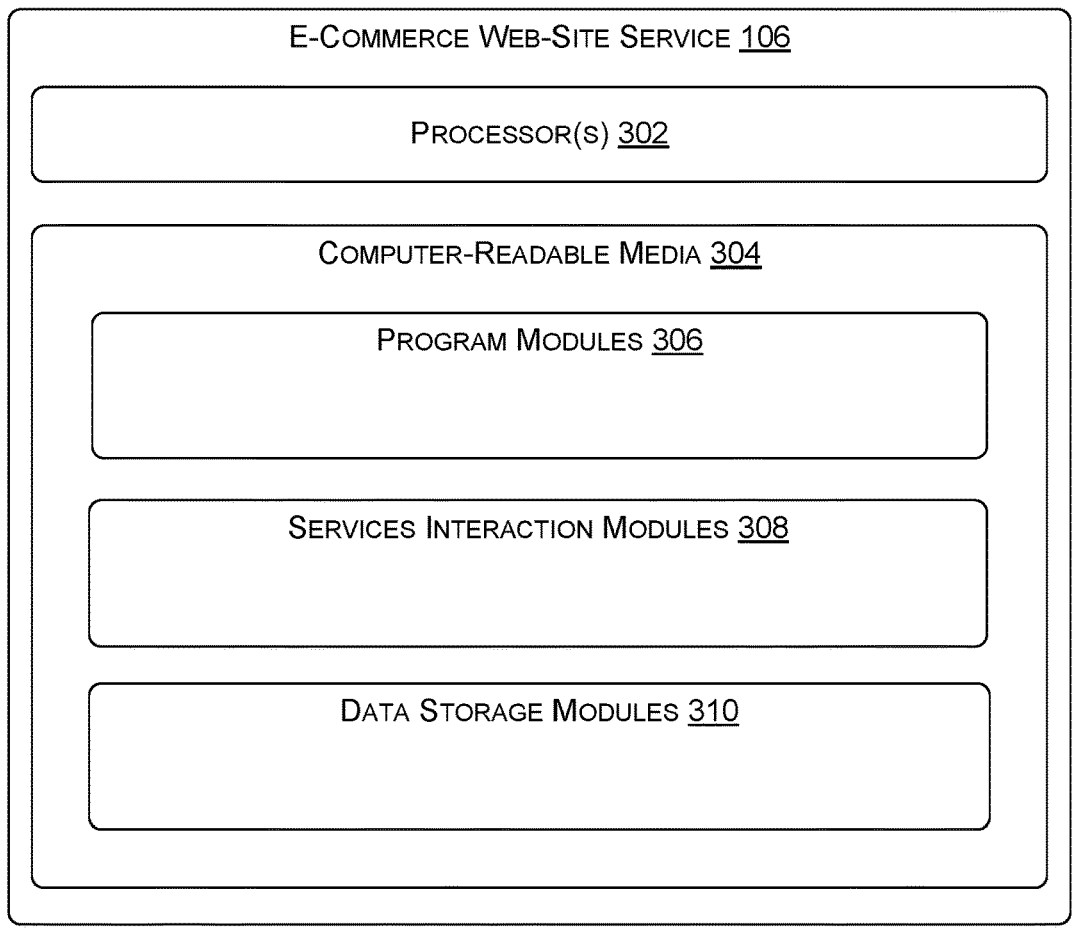
FIG. 3 is a schematic diagram of an illustrative computing architecture to provide an e-commerce website service for interaction with a client and/or control of the other services of an e-commerce system.

FIG. 3 is a schematic diagram of an illustrative computing architecture 300 of an example e-commerce website service 106 that may provide the functionality described herein with respect to FIGS. 1 and 2. The computing architecture 300 may be implemented in a distributed or non-distributed computing environment.

The e-commerce website service 106 may include one or more processors 302 and one or more computer readable media 304 that stores various modules, applications, programs, or other data. The computer-readable media 304 may include instructions that, when executed by the one or more processors 302, cause the processors to perform the operations described herein for the e-commerce website service 106. In some embodiments, the computer-readable media 304 may store program modules 306, service interaction modules 308 and data storage modules 310, which are described in turn. The components may be stored together or in a distributed arrangement.

Implementations may be provided as a computer program product including a non-transitory machine-readable storage medium having stored thereon instructions (in compressed or uncompressed form) that may be used to program a computer (or other electronic device) to perform processes or methods described herein. The machine-readable storage medium may include, but is not limited to, hard drives, floppy diskettes, optical disks, CD-ROMs, DVDs, read-only memories (ROMs), random access memories (RAMs), EPROMs, EEPROMs, flash memory, magnetic or optical cards, solid-state memory devices, or other types of media/machine-readable medium suitable for storing electronic instructions. Further, embodiments may also be provided as a computer program product including a transitory machine-readable signal (in compressed or uncompressed form). Examples of machine-readable signals, whether modulated using a carrier or not, include, but are not limited to, signals that a computer system or machine hosting or running a computer program can be configured to access, including signals downloaded through the Internet or other networks. For example, distribution of software may be by an Internet download.

The program modules 306 may operate to perform the functions of an e-commerce website service. For example, the program modules 306 may provide a user interface functionality that obtains and/or generates website data that is sent to the user device 104 for use in creating dynamic webpages of the e-commerce website. Further, the program modules 306 may operate to handle incoming and outgoing communications between customers, such as user 102, and the e-commerce service as a whole.

The services interaction modules 308 operate to interface with the billing service 108 and the order fulfillment service 110. For example, when the e-commerce website service 106 receives a client order 202, the services interaction modules 308 may operate to issue an "execute billing" request to the billing service 108 and an "execute order" request to the order fulfillment service 110. The service interaction modules 308 may further operate to handle the responses from services 108 and 110 to the e-commerce website service 106.

The data storage modules 310 may be, operate and/or interact with one or more data stores. For example, the data storage modules 310 may, at the instruction of the program modules 306, interact with one or more product data stores (e.g. product databases) to obtain product information requested by a user 102. In some implementations, the data storage modules 310 may further store anticipated client requests for which anticipatory requests have been issued to the billing service 108 and the order fulfillment service 110.

Though not shown, the billing service 108, order fulfillment service 110, inventory service 112 and shipping service 114 may comprise similar components to those of the e-commerce website service 106 illustrated in FIG. 3. These and other variations of the specific form taken by the services 106-114 would be apparent to one of ordinary skill in the art in view of this disclosure.

Illustrative Operation

Figure 4:
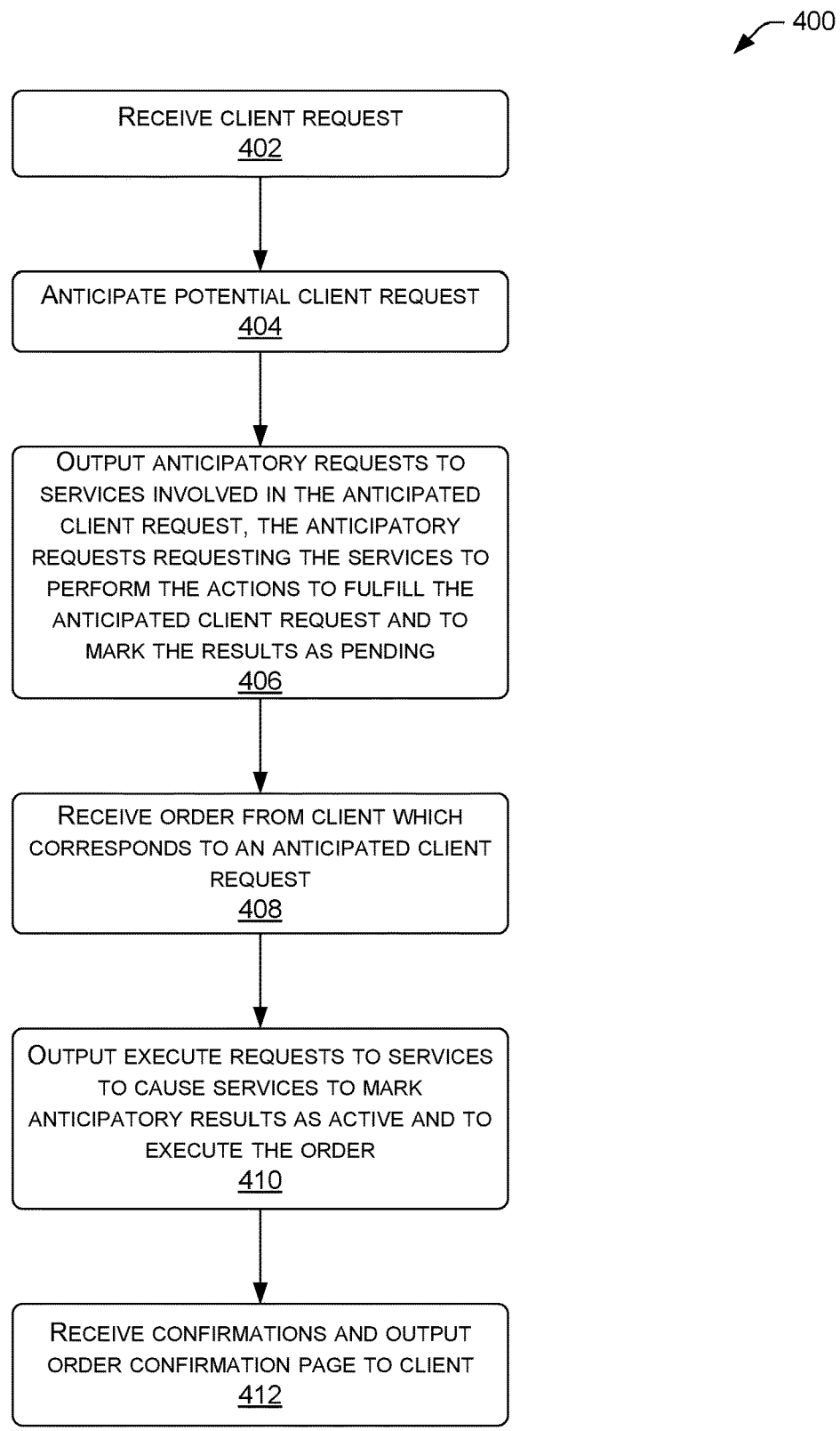
FIG. 4 is a flow diagram of an illustrative process that provides for anticipating potential client requests and for taking anticipatory action based on the anticipated client requests.

FIG. 4 is a flow diagram of an illustrative process 400 that may provide for anticipating potential client requests and for taking anticipatory action based on the anticipated client requests as described above regarding FIGS. 1-3. Process 400 may be performed by the e-commerce website service 106 in conjunction with the billing service 108, the order fulfillment service 110, the inventory service 112 and the shipping service 114. Of course, the process 400 (and other processes described herein) may be performed by other similar and/or different devices or services and/or in different environments.

The process 400 is illustrated as a collection of blocks in a logical flow graph, which represent a sequence of operations that can be implemented in hardware, software, or a combination thereof. In the context of software, the blocks represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the process. Other processes described throughout this disclosure (e.g., FIGS. 5, 7-8, 10 and 12), in addition to process 400, shall be interpreted accordingly.

At 402, the e-commerce website service 106 receives a client request 116 from a user device, such as user device 104. Though not explicitly shown, it should be understood that the e-commerce website service 106 may continue to receive client requests throughout the process flow 400.

At 404, the e-commerce website service 106 anticipates or otherwise makes a determination of potential client requests that may be received from the user device 104 (such as a request that may require one or more database inserts). While shown as following block 402, block 404 may be performed asynchronously, in parallel, before or after any given iteration of block 402.

The determination of which potential client requests are selected or anticipated from all potential client requests may vary depending on the details of a given implementation. For example, in some implementations, machine learning may be utilized by the e-commerce website service 106 to derive the determination of which potential client requests should be acted upon by issuing anticipatory requests. For example, machine learning algorithms may be utilized to perform a statistical analysis of user requests received in various scenarios to allow for a determination of a statistical likelihood of various client requests being received given a state of interaction with a user. For example, the various attributes of the state of the interaction with the user may be analyzed for each client order 202 received by the e-commerce website service 106 to provide a statistical likelihood of receiving a client order 202 based on the state of interaction with the user (e.g., how often order requests are received after a check out page is requested, after an n-th visit to a wish list of the e-commerce website that includes a product, etc.). In some implementations, the statistical analysis may be performed on a per-user basis or a per-group of users basis. An example of a per-group of users basis is as follows. Using the history of interaction of a plurality of users, a system may operate to determine groups of similar users. Further analysis can be performed to determine, given a state of interaction, a statistical probability of receiving a client order from a user of each group of users.

In other implementations, the logic or process used to determine anticipated client requests may be determined by a human developer and implemented as instructions for performing the logic or process. For example, a human developer might determine that when a client adds a product to their "cart," the e-commerce website service 106 should issue anticipatory requests corresponding to an anticipated order for that product. In other implementations, the e-commerce website system 106 may issue the anticipatory requests upon receiving a request from the user device 104 for information for displaying a check out page or a request to initiate a check out process. In another example implementation, when a user removes an item from the user's cart, the e-commerce website service 106 may determine that, if items remain in the user's cart, the user is likely to proceed by issuing a client order request. Accordingly, the e-commerce website service 106 may issue anticipatory requests corresponding to an order for the items remaining in the user's cart.

These and other variations on the manner of determining what anticipatory requests to issue in what contexts would be apparent to one of ordinary skill in the art in view of this disclosure.

At 406, the electronic commerce website service 106 outputs requests to the appropriate services that instruct the services (e.g., the billing service 108 and order fulfillment service 110) to process the anticipated requests of the client such that the services operate to determine results of the anticipated requests but mark the results as pending. For example, for anticipated request requiring a database insert the services may process the anticipated requests, make the database inserts but marks the inserted records as pending. In some implementations, the e-commerce website service 106 may utilize default information when generating anticipatory requests. For example, the e-commerce website service 106 may utilize the customer's default shipping and billing information to generate an anticipatory billing request 120 and an anticipatory order request 122. Though not illustrated in FIG. 4, following block 406, the process may continue to receive client requests and anticipate potential client requests (i.e., blocks 402-406) during the processing described below regarding blocks 408-412.

At 408, the e-commerce website service 106 receives an order from a client, such as user 102 which corresponds to an anticipated request. At 410, the e-commerce website service 106 may output execute requests to the services such that the services mark the previously determined pending results as active (e.g. mark corresponding pending database records previously inserted as active). In turn, marking the previously determined results as active causes the order to be processed. At 412, the e-commerce website service 106 receives one or more confirmations from the services that respective portions of the order processing are complete. Once the various portions of the order processing are completed, the e-commerce website service 106 may output an order confirmation page to the user device 104 for display to the user 102.

Figure 5:
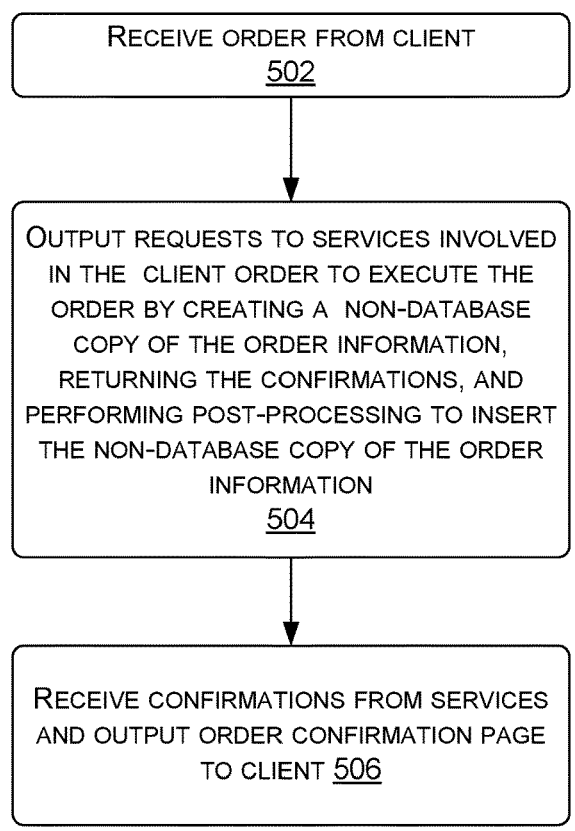
FIG. 5 is a flow diagram of an illustrative process that provides a response to a request utilizing parallel or post-process handling of delay causing actions involved in fulfilling the request.

FIG. 5 is a flow diagram of an illustrative process 500 that may avoid delays in systems, such as the above discussed delays that may occur due to database inserts. While described above in the context of issuing anticipatory requests, the disclosed techniques and systems are not so limited. As mentioned above with regard to FIG. 2, rather than issuing anticipatory requests to the billing service 108 and the order fulfillment service 110 before a client order 202 is received, the e-commerce website service 106, the billing service 108, order fulfillment service 110, inventory service 112 and shipping service 114 may be programmed to perform real-time operations on non-database forms of the data during order processing and then insert database records into the databases in post processing. FIG. 5 illustrates such an implementation.

At 502, the e-commerce website service 106 receives a client order, such as client order 202. As noted above, the e-commerce website service 106 may not have issued anticipatory requests for previous client requests as in the implementation discussed with regard to FIG. 2. Rather, at 504, the e-commerce website service 106 issues order requests to the services involved in processing the client order 202. In particular, the requests issued by the e-commerce website service 106 may cause the services to execute the order by creating a non-database copy of the order information (i.e. the results of the order processing). The contents of the non-database form of the records may be serialized into a format such as a JavaScript Object notation (JSON) or Extensible Markup Language (XML) format and stored in temporary storage.

The services return confirmations based on the non-database version of the information. Then, in a parallel or post-processing mode, the services insert database records that correspond to the non-database form of the order information into the respective databases of the services. For example, parallel or post processing may be performed on the aforementioned JSON or XML form of the data by de-serializing the JSON or XML form of the data into relational data for insertion into a relational database.

At 506, the e-commerce website service 106 receives the confirmations from the services and outputs the order confirmation page to the client device 104.

As discussed above, the techniques and systems described herein are not limited by the details of the example implementations. For example, in the implementation illustrated in FIG. 5, no anticipatory requests are issued. However, some implementations may combine the functionality described with respect to FIGS. 1-4 with that illustrated in FIG. 5. In an example of such an implementation, client requests would be anticipated and acted upon as discussed above with regard to process flow 400. When a client request is received, if the client request was anticipated, the process would continue in accordance with the process flow 400. Otherwise, if the client request was either unanticipated or the pending database records have expired, the process may continue according to process flow 500.

Figure 6:
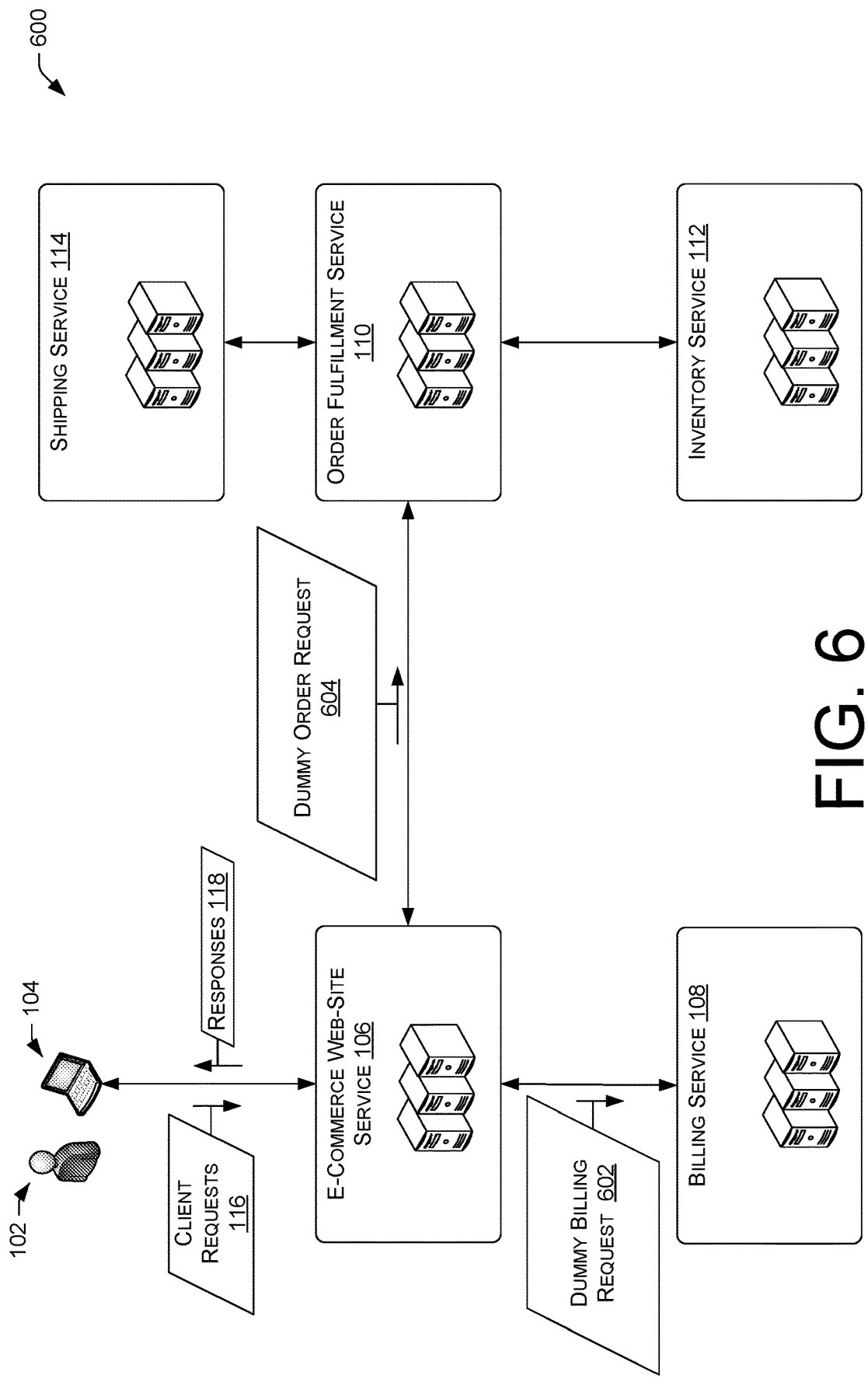
FIG. 6 is a schematic diagram of an illustrative environment that that may provide optimization of request handling in production systems by pre-caching data involved in fulfilling anticipated client requests.

Another example of variation is on the context of usage of the techniques and systems described herein. While the optimizations described above are discussed in the context of database inserts, implementations of the disclosed techniques and methods are not so limited. FIG. 6 provides an example implementation outside the context of database inserts.

FIG. 6 is a schematic diagram of an illustrative computing architecture 600 that may avoid delays in systems, such as by anticipating client requests and issuing, for example, dummy requests to cause the cache of production machines to be populated. Such an implementation may provide optimize performance, such as in cases where the data needed to process an anticipated client request would not otherwise be cached. Specifically, the experience of a user (e.g. user 102) interacting with the e-commerce website service 106 may be improved by avoiding delays that would otherwise be caused by loading data into cache memory after receiving a client request due to the data not already being cached.

In operation, the e-commerce website service 106 receives client requests 116 from the user device 104. Based on processing of the client requests 116 and interaction with the services 108-114, the e-commerce website service 106 provides responses 118 to the user device 104. While the client requests 116 are being received and responses 118 are being sent to the user device 104, the e-commerce website service 106 may perform processing to anticipate potential client requests. Based on the anticipated client requests, the e-commerce website service 106 may issue a dummy billing request 602 to the billing service 108 and/or a dummy order request 604 to the order fulfillment service 110. In some implementations, the dummy requests may be generated such that the service receiving the dummy request processes the dummy request normally but then discards the result.

As such, the data used to process the dummy requests (and by extension, the anticipated client request) may be loaded from storage and cached. If the user 102 subsequently makes the anticipated client request, the client request may be processed more quickly and thereby provide a better experience to the user 102 and result in greater customer satisfaction. An example implementation of such a process is discussed below with regard to FIG. 7.

Figure 7:
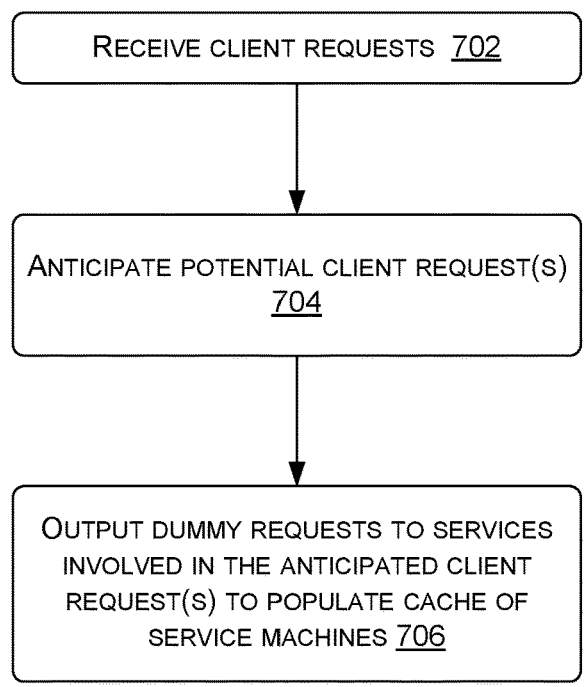
FIG. 7 is a flow diagram of an illustrative process that may provide for anticipating potential client requests and for taking anticipatory action based on the anticipated client requests.

FIG. 7 is a flow diagram of an illustrative process 700 that provides for the optimization of caching of data for use in responding to client requests. In particular, process 700 illustrates an example process flow showing the operations of the e-commerce website service 106 to optimize the caching of the data for use responding to client requests by issuing dummy requests based on anticipated client requests. Although discussed below in the context of the e-commerce website service 106, one of ordinary skill in the art would recognize that the illustrative process 700 may be applied outside of this environment.

At 702, the e-commerce website service 106 receives a client request 102. As with similar blocks of previous process flow diagrams, the receiving of client requests may continue throughout the remainder of the process, in sequence, parallel, asynchronously, etc.

At 704, potential client requests are anticipated or determined by the e-commerce website service 106. This may be performed in a manner similar to that described above with respect to FIGS. 3-6.

At 706, once an anticipated client request has been determined, the e-commerce website service 106 may output dummy requests to the various services involved in fulfilling the anticipated client request to populate the cache of the service machines with the data utilized in handling the anticipated client request.

FIG. 8 is a flow diagram of an illustrative process 800 that provides for another optimization of production systems by providing for the setting of dynamic timeouts, such as inter-service timeouts, in production systems. Client systems typically have static timeouts when calling servers. When these timeouts are reached, the client system may indicate a failure of the request to the user. In this context, client systems are any system, service, device, etc. which makes a request to a server system, which in this case could also be any system, service, device, etc.

While timeouts provide for the proper functioning of interacting systems, static timeouts may not adequately allow for variation in the complexity of requests (e.g., where some requests take longer than others to process). In the context of an e-commerce website service 106, an example client request that may take longer to process may be a client order 202 that is larger than normal, e.g. an order with many line items or involving many products. In such a case, a web application operating at the user device 104 may be optimized to recognize large requests and to set a relatively larger timeout value based on the size of the request. While the above example is provided in the context of requests from the user device 104 to the e-commerce website service 106, implementations are not so limited. Rather, the determination of dynamic timeouts based on complexity or processing load requirements may be utilized for inter-service (or inter-system) communication between the various services of the e-commerce system.

In the example implementation of FIG. 8, the process flow 800 provides for the usage of dynamic timeouts between services of the e-commerce system, such as the e-commerce website service 106, the billing service 108 and the order fulfillment service 110.

At 802, the e-commerce website service 106 receives a client request. At 804, the e-commerce website service 106 generates inter-service requests to be submitted to the billing service 108 and/or the order fulfillment service 110. The e-commerce website service 106 then analyzes the generated inter-service requests to determine or estimate the complexity and/or processing load of the generated inter-service requests. Based on the determined complexity or processing load of the generated requests, the e-commerce website service 106 determines timeouts for the requests. At 806, the e-commerce website service 106 outputs the requests to the billing service 108 and/or the order fulfillment service 110 with the respective determined timeouts.

Thus, implementations of the disclosed techniques and systems may overcome the failing of conventional static timeout systems in which, for example, responses for requests to the billing service 108 or order fulfillment service 110 corresponding to relatively large client orders 202 may have timed out and failed. Specifically, for relatively large client orders 202, the e-commerce website service 106 may set a relatively longer dynamic timeout for responses from the billing service 108 and order fulfillment service 110. Accordingly, if a response to a billing request or order request corresponding to the relatively large client order 202 is received during the extended dynamic timeout period, the e-commerce website service 106 will not have determined the inter-service request to have failed and reissued the inter-service request or indicated a failure of the inter-service request to a user. Thus, some implementations hereof may improve user satisfaction.

FIG. 9 is a schematic diagram of an illustrative environment 900 that provides for optimization of production systems (e.g. e-commerce systems) by, for at least some requests, issuing copies of a request to a plurality of different processing entities of a target service or system and using the first received response. Specifically, in the example implementation illustrated FIG. 9, a copy of a billing request is issued to each of a plurality of billing service machines. In some implementations, the requesting service receives a first response from one of the plurality of target service machines, accepts the first response and proceeds. Subsequently received responses may be discarded.

Such an implementation may provide faster processing of client requests over issuing the request to a single target service machine. This is because, for a given request, the processing time by a target service machines may be variable and/or unpredictable by the requesting service due to various conditions in the target service, such as total number of requests being processed at that time, the state of the caches on the target machines, the memory in use at that instant in time, the amount of memory waiting to be garbage collected, etc.

In operation, the e-commerce website service 106 may receive a client request 902 and issue a copy of a corresponding billing request 904 to multiple machines of the billing service 108, shown herein as billing service machine 906(1), billing service machine 906(2) and billing service machine 906(3). In some implementations, the issuing of the copies of the billing requests may be done in parallel using threaded processing.

Upon receiving the copies of the request 904, the billing service machines 906 each process the request 904 normally and send a response to the requesting service, in this case, the e-commerce website service 106. Specifically, the billing service machine 906(1) returns response 908(1), the billing service machine 906(2) returns response 908(2) and the billing service machine 906(3) returns response 908(3).

Due to variations in the condition or state of each of the billing service machines 906, the responses 908 are received by the e-commerce website service 106 at different times. The e-commerce website service 106 accepts the first received response 908 and continues normally. Later received responses 908 are discarded. For example, if response 908(2) is the first received response, response 908(2) is accepted and utilized in further processing. Responses 908(1) and 908(3) may be discarded when received.

While the above description of FIG. 9 is in the context of a specific implementation, the system and techniques disclosed herein may be generalized. For example, as discussed above, the issuance of copies of a request to multiple target service machines is on an inter-service basis. This should not be taken as a limitation. In some implementations, similar functionality may be employed by the user device 104 or an intra-service device that, upon receiving a request at the target system, issues copies of the request to multiple machines in the target service, returns the first response to the requester, and discards the later received responses.

Further, as will be discussed in greater detail below with regard to FIG. 10, the service or device issuing multiple copies of a request may do so selectively. For example, the e-commerce website service 106 may evaluate each client request 902 to determine a priority or score for the request 902. The priority or score of the request 902 may be utilized to determine whether copies of the corresponding requests should be issued to more than one target service machine and/or how many target service machines should receive a copy of the request.

Additionally, though FIG. 9 includes sending copies of a request to separate machines 906 of a service, this should not be taken as a limitation. Rather, the systems and techniques discussed above may be applied to any system in which one processing entity may handle a request separate from other processing entities. In other words, the machines 906 may be any type of processing entity. In this context, processing entities are made up of system resources as discussed above.

Figure 10:
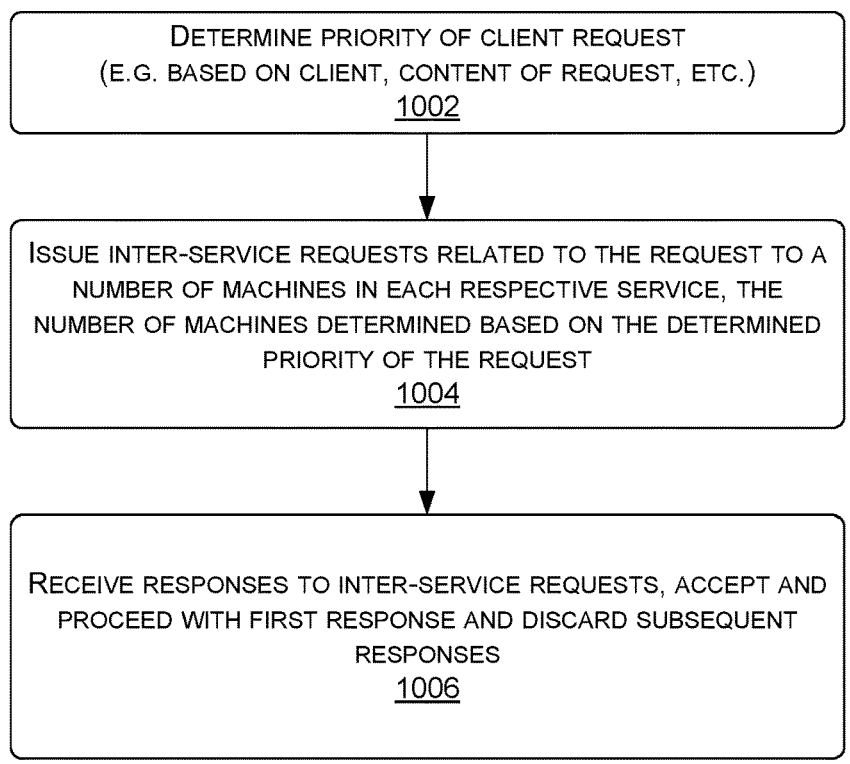
FIG. 10 is a flow diagram of an illustrative process to provide for the optimization of response times for requests between, for example, services of a multiservice production system by issuing the request to multiple processing entities of the target service.

FIG. 10 is a flow diagram of an illustrative process 1000 that provides for optimization of production systems by, for at least some requests, issuing copies of a request to a plurality of different machines of a target service and using the first received response. As described above, these functions may be performed by the e-commerce website service 106, a user device 104, or any other system or device that communicates with a system or service that includes multiple processing entities. It should be noted that there is no requirement for these functions to be employed in an electronic commerce service nor are these functions restricted in use to electronic commerce services. The use of the e-commerce website service 106 to perform these functions is merely provided as an example for ease of understanding.

At 1002, the e-commerce website service 106 receives a client request and determines a priority of the request. For example, the priority of the request may be determined based on the user or client, the content of the request, a size or value of an order or potential order associated with the request, or any other relevant criteria. In a particular example implementation, a client request from a user 102 that has an extensive purchase history with the e-commerce website may be assigned a higher priority than a client request from a user 102 that has never before or rarely purchased products or services from the e-commerce website (all other relevant criteria being equal).

At 1004, the e-commerce website service 106 may issue inter-service requests related to the client request to a number of machines in each respective service involved in processing the client request. The number of machines in each respective service (and the number of copies of the request given to each service) may be determined based on the priority assigned to the request at 1002. For example, in some implementations, requests related to a low priority client request may be submitted to a single machine in each service in the conventional fashion. On the other hand, requests related to a mid-level priority client request may be submitted to two machines in each service and requests related to a high priority client request may be submitted to five machines in each service. The priority ranking and numbers of machines given above are merely examples for ease of explanation. These aspects may vary depending on the details of a given implementation. It should also be noted that the number of machines in each respective service that receive a copy of a request may be determined on a per service basis. For example, the e-commerce website service 106 may submit two copies of a billing request related to a high priority client request to the billing service 108 and three copies of an order request related to the high priority client request to the order fulfillment service 110.

Subsequently, at 1006, the e-commerce website service 106 begins receiving responses to the inter-requests issued to multiple target service machines. The first received response from each service is accepted and utilized in further processing. Later received responses for a given inter-service request may be discarded.

While the example implementations described above only utilize the first received response, implementations are not so limited. For example, in some implementations, the first and second received responses for a given request may be compared to ensure consistency. If the first and second received responses match, the contents of the response may be utilized in further processing. In such an implementation, any subsequently received responses may be discarded or utilized in some other way. These and other variations on the above described system and process would be apparent to one of ordinary skill in the art in view of this disclosure.

Figure 11:
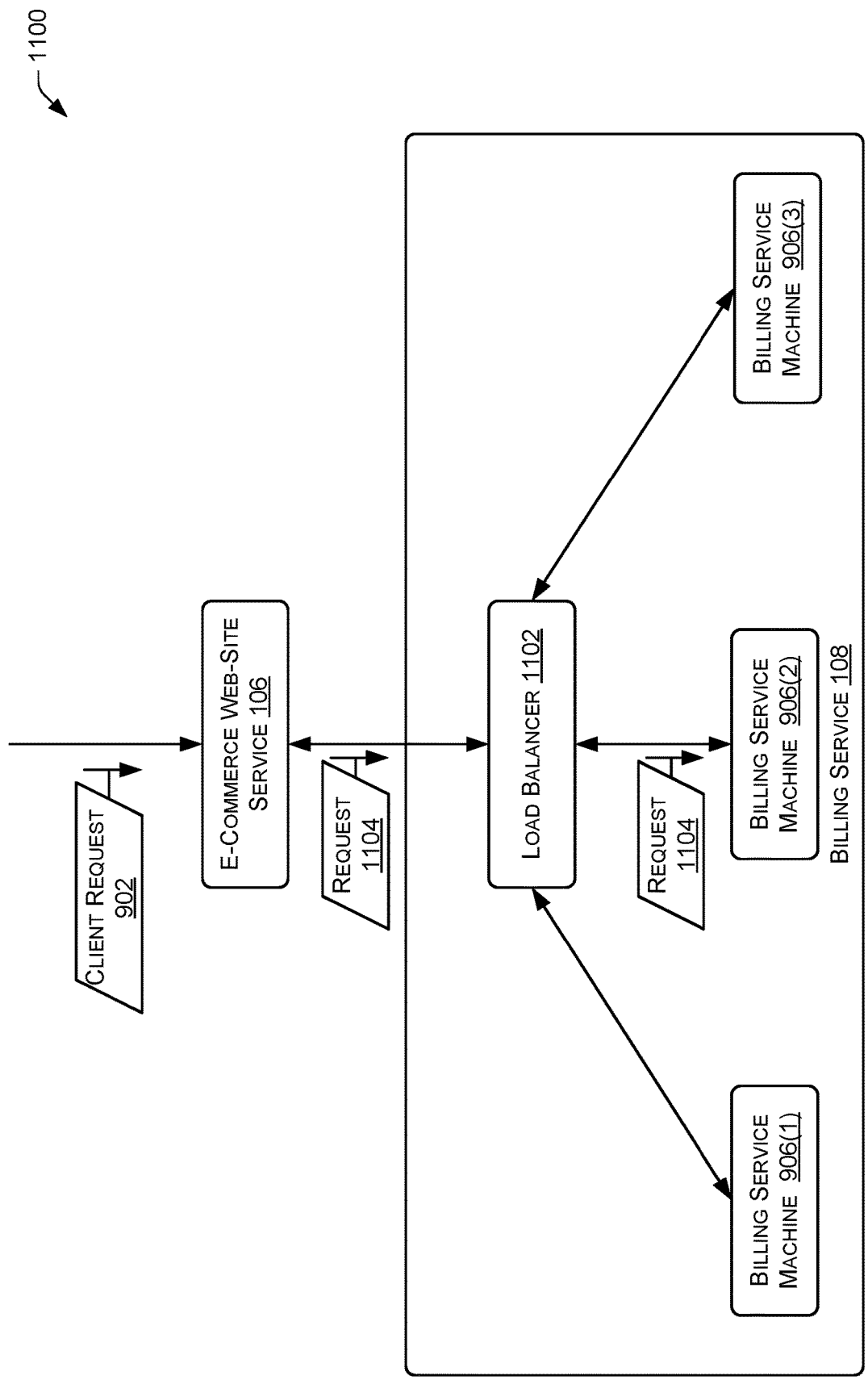
FIG. 11 is a schematic diagram of an illustrative environment that provides a load balancer of a production system, such as an electronic commerce system, that provides a load balancing functionality based at least in part on a weighting of client requests.

FIG. 11 is a schematic diagram of an illustrative environment 1100 that provides optimization of production systems, such as electronic commerce systems, by providing load balancing based at least in part on a weight assigned to client requests. The services and/or devices illustrated in the environment 1100 are substantially the same as those illustrated in environment 900 with the addition of a load balancer 1102 to the billing service 108.

Systems employ load balancers to distribute requests across a set of processing entities, such as machines. Typically, the load balancers keep the number of active requests balanced across the target processing entities. So, for example, if five processing entities are each actively processing ten requests, and a sixth processing entities is actively processing nine requests, the next request would be sent to the sixth processing entities. This is known as the "least connections" approach. However, this approach does not work well for the case where the sixth processing entities is actively processing nine large or otherwise complex requests (e.g. client orders 202 with hundreds or thousands of line items per client order). Implementations of the systems and techniques discussed below may overcome these failings of typical load balancers by utilizing a weighting of client requests based on the processing load to fulfill the request or other attribute of the request (e.g. a number of products in an order, a number line items in a request, whether the products or line items of the requests may be fulfilled by a single distribution location or if multiple distribution locations are involved, or any other attribute of a request or processing of the request which may bear on the processing load or time to fulfill the request).

In operation, the e-commerce website service 106 receives the client request 902 and issues an inter-service request 1104 to the billing service 108. The request 1104 is received by the load balancer 1102 of the billing service 108. The load balancer 1102 analyzes the request 1104 to determine a weight of the request. As discussed above, this may be determined based on any attribute of the request or of the processing of the request which may bear on the processing time required to fulfill the request 1104, referred to herein as the processing load to fulfill the request. For ease of explanation, with regard to FIGS. 11 and 12, the determination of the weighting of the request 1104 will be discussed as being determined based on a number of line items in the request (e.g. a number of products in an order). Thus, in some implementations, a request 1104 involving six line items may have a weight of six while a request 1104 involving three line items may have a weight of three.

The load balancer 1102 may utilize the weight of the requests 1104 in at least two ways. First, the load balancer utilizes the weight of the request 1104 to determine an aggregate load for each machine in the relevant service, here the billing service 108. For example, the aggregate load of a particular machine may be the sum of the weights of the requests 1104 currently assigned to the machine. Alternatively, the aggregate load may be determined as the average weight of the requests being processed by the machine multiplied by the number of requests currently assigned to the machine.

The load balancer 1102 may utilize the weights of the requests in the second manner while assigning requests 1104 amongst machines of a target service. Specifically, the load balancer may determine which machine or machines of the target service, in this case the billing service 108, has a low or the lowest aggregate load of requests currently assigned to the machine. The weight of the request 1104 to be assigned to a target machine may be used to determine the machine to which the request 1104 is to be assigned. For example, if the request 1104 to be assigned has a relatively low weight, the service may choose a machine with a low, but not necessarily the lowest, aggregate load. On the other hand, if a request 1104 to be assigned has a relatively high weight, the service may choose the machine of the target service with the lowest aggregate load. Many variations are possible on the usage of the weights of the requests to determine which machine a given request should be assigned to. Further, as discussed above, though FIG. 11 includes load balancing between separate machines 906, this should not be taken as a limitation. Rather, the systems and techniques discussed above may be applied to any system in which one processing entity may handle a request separate from other processing entities. In other words, the machines 906 may be any type of processing entity. These and other variations would be apparent to one of ordinary skill in the art in view of this disclosure.

Figure 12:
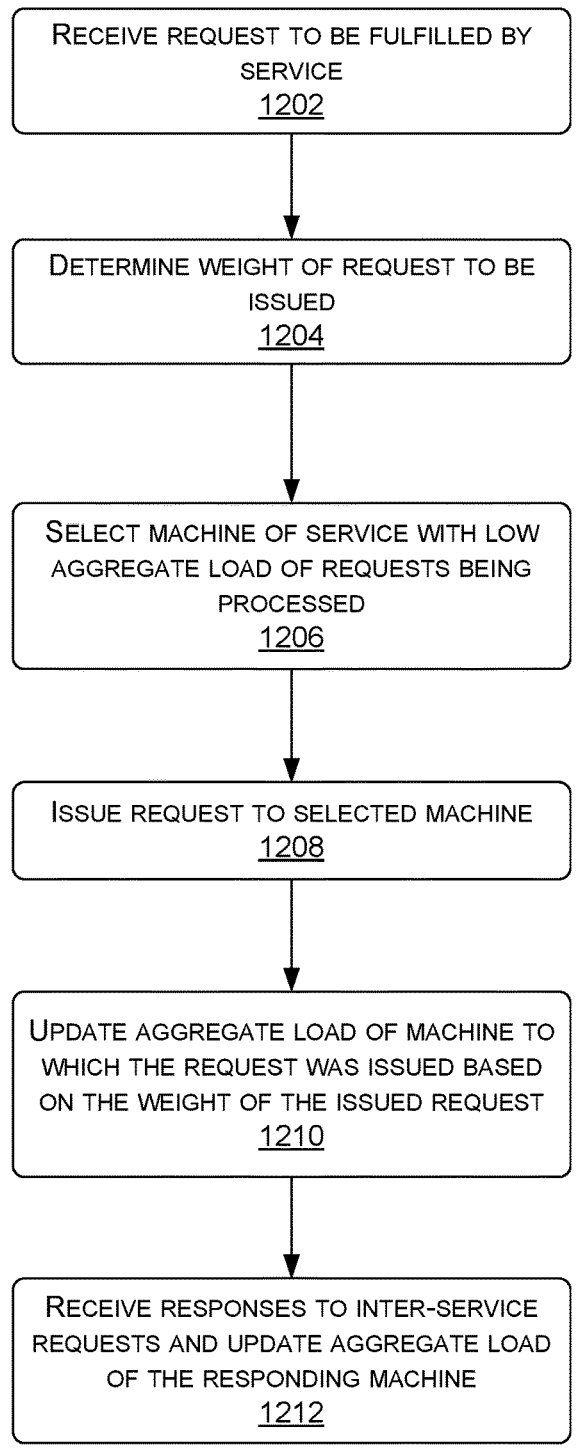
FIG. 12 is a flow diagram of an illustrative process to provide for optimization of production systems, such as electronic commerce systems, by providing load balancing functionality based at least in part on a weighting of client requests.

FIG. 12 is a flow diagram of an illustrative process 1200 that provides load balancing using request weights in a system such as that illustrated in FIG. 11. The process 1200 may be performed by the load balancer 1102. However, implementations are not so limited and other devices or systems may perform some or all of the process flow 1200.

At 1202, the load balancer 1102 receives a request from the e-commerce website service 106 that is to be fulfilled by a service associated with load balancer 1102. As discussed previously, in some implementations, the request may be generated by the e-commerce website service 106 based on received client request (such as client order 202). However, implementations are not so limited and, in some implementations, the inter-service request may be generated for internal purposes, such as inter-service synchronization.

At 1204, the load balancer 1102 determines a weight of the received request. As discussed above, the weight of the request may be determined based on any number of factors, such as factors that may affect the processing load or processing time that will be expended in fulfilling the request.

At 1206, the load balancer 1102 selects a machine of the service with a low aggregate load. As discussed above with regard to FIG. 11, the aggregate load of a machine may be the sum of the weights of the requests currently assigned to the machine. At 1208, the load balancer 1102 assigns the received request to the selected machine.

At 1210, the load balancer 1102 updates the aggregate load of the machine to which the request was assigned based, at least in part, on the weight of the newly assigned request.

At 1212, the load balancer 1102 receives a response to the request 1104 and updates the aggregate load of the responding machine by, for example, subtracting the weight of the request 1104 from the aggregate load of the responding machine.

The above discussion of FIGS. 11 and 12 are merely examples and should not be taken as limiting. Variations on the environment 1100 and process flow 1200 would be apparent to one of ordinary skill in the art in view of this disclosure.

For example, though illustrated in FIG. 11 as a part of the billing service 108, the load balancer 1102 may be part of the e-commerce website service, a separate service that is called by services 106 and 108, etc. Further, in the discussion of FIG. 12, it was indicated that the weight of the request to be issued was determined by the load balancer 1102. However, this should not be taken as a limitation. For example, the weight of the request may be determined by the requesting service, the target service or some other portion of the system. In a particular example, the service 106 may issue the request to the service 108. The service 108 may then determine a weight of the request and issue a "call" to an independent load balancer 1102. In some implementations, the call may provide the load balancer 1102 with the weight of the request. Based on the call, the load balancer 1102 may determine which machine of the billing service 108 should be assigned the request.

In another variation of the load balancer 1102, the load balancer 1102 may determine the weight of the requests based on additional or different factors and may treat requests with different weights or priorities differently. This may be done in a similar manner as discussed above with regard to FIG. 10 in which a priority of the request was used in determining its treatment. More particularly, in some implementations, the weight assigned to a request may be determined at least in part on the user or client, the content of the request, a value of the order or potential order associated with the request or other such criteria. For example, the load balancer may treat a request from a user with an extensive purchase history differently from a request from a user who rarely makes purchases. Such different treatment could take various forms. One possible form of differential treatment is that the load balancer may take the request from the high priority user out of order such that the high priority user's request is "jumped ahead" in a queue for assignment to machines of the service. Another differing treatment could be that the load balancer may assign high-priority users' requests to dedicated machines. Such dedicated machines may be machines that are only used or primarily used to process requests for high priority users. Still another differing treatment could be that, all other factors being is similar, a high priority user's request may be assigned to a machine with the lowest aggregate load (as opposed to a low aggregate load). These and many other variations on the operation of the load balancer in assigning weights and treating differently weighted requests are within the scope of this disclosure. Such other variations would be apparent to one of ordinary skill in the art in view of this disclosure.

Conclusion

Although the subject matter has been described in language specific to structural features and/or methodological acts, it is to be understood that the subject matter defined in the appended claims is not necessarily limited to the specific features or acts described. Rather, the specific features and acts are disclosed as illustrative forms of implementing the claims.

The invention claimed is:

1. One or more non-transitory computer-readable storage media storing computer-executable instructions that, when executed on one or more processors, perform acts comprising:
receiving, from a client device, a client request to generate a data record and write the data record in a data store;
generating, in response to the client request, the data record;
determining that writing the data record in the data store would cause a delay in completion of the client request;
transmitting the client request to a service to store the data record in a cache outside of the data store;
receiving a first confirmation from the service in response to the data record being stored in the cache;
sending, to the client device, a second confirmation of fulfilment of the client request based at least in part on the first confirmation; and
writing the data record to the data store from the cache.

2. The one or more non-transitory computer-readable storage media as recited in claim 1, wherein the data record stored in the cache comprises serialized data.

3. The one or more non-transitory computer-readable storage media as recited in claim 2, wherein the serialized data is one of JavaScript Object notation (JSON) data or Extensible Markup Language (XML) data.

4. The one or more non-transitory computer-readable storage media as recited in claim 2, wherein the writing the data record to the data store from the cache includes de-serializing the serialized data into relational data for storage in the data store.

5. The one or more non-transitory computer-readable storage media as recited in claim 1, wherein the writing of the data record to the data store is performed after the second confirmation is sent to the client device.

6. The one or more non-transitory computer-readable storage media as recited in claim 1, wherein the service is further configured to perform the execution of the client request.

7. The one or more non-transitory computer-readable storage media as recited in claim 6, wherein the client request is a client order, and the service is one or more of a billing service, an inventory service, and a shipping service.

8. A computing system comprising:
one or more processors;
one or more computer-readable media maintaining:
a cache; and
computer-executable instructions that, when executed on the one or more processors, perform acts comprising:
based at least in part on a statistical analysis of historical data associated with a client using a client device, determining a predicted client request by the client, wherein at or before a time of determining the predicted client request, an actual client request corresponding to the predicted client request has not been received from the client device;
issuing a first dummy request associated with the predicted client request to a first service for processing;
issuing a second dummy request associated with the predicted client request to a second service for processing; and
storing data associated with the first dummy request in the cache, the data available to fulfill the actual client request in response to the actual client request being received from the client device.

9. The computing system as recited in claim 8, the acts further comprising:
receiving the actual client request from the client device; and
processing the actual client request using the data stored in the cache.

10. The computing system as recited in claim 8, wherein the actual client request is a second client request, the acts further comprising receiving a first client request from the client device, and wherein determining the predicted client request is based at least in part on the first client request.

11. The computing system as recited in claim 8, wherein the first service is configured to process the first dummy request and the second service is configured to process the second dummy request, wherein processing the first dummy request comprises storing first data associated with the first dummy request in a first cache associated with the first service, and processing the second dummy request comprises storing second data associated with the second dummy request in a second cache associated with the second service.

12. The computing system as recited in claim 8, wherein the actual client request is a client order, and wherein the first service comprises at least one of billing service, an inventory service, or a shipping service.

13. The computing system as recited in claim 8, wherein the first service is configured to discard a result obtained by processing the first dummy request.

14. A computer-implemented method comprising:
receiving, from a client device, a client request to generate a data record and write the data record in a data store;
generating, in response to the client request, the data record;
determining that writing the data record in the data store would cause a delay in completion of the client request;
transmitting the client request to a service to store the data record in a cache outside of the data store;
receiving a first confirmation from the service in response to the data record being stored in the cache;
sending, to the client device, a second confirmation of fulfilment of the client request based at least in part on the first confirmation; and
writing the data record to the data store from the cache.

15. The computer-implemented method as recited in claim 14, wherein the data record stored in the cache comprises serialized data.

16. The computer-implemented method as recited in claim 15, wherein the serialized data is one of JavaScript Object notation (JSON) data or Extensible Markup Language (XML) data.

17. The computer-implemented method as recited in claim 15, wherein the writing the data record to the data store from the cache includes de-serializing the serialized data into relational data for storage in the data store.

18. The computer-implemented method as recited in claim 14, wherein the writing of the data record to the data store is performed after the second confirmation is sent to the client device.

19. The computer-implemented method as recited in claim 14, wherein the service is further configured to perform the execution of the client request.

20. The computer-implemented method as recited in claim 19, wherein the client request is a client order, and the service is one or more of a billing service, an inventory service, and a shipping service.

* * * * *